(12) United States Patent
Yoshinaka et al.

(10) Patent No.: US 7,908,713 B2
(45) Date of Patent: Mar. 22, 2011

(54) OPERATING KNOB

(75) Inventors: Shinichi Yoshinaka, Kariya (JP); Hiroshi Mokudai, Kariya (JP); Takashi Kawaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/149,013

(22) Filed: Apr. 24, 2008

(65) Prior Publication Data

US 2008/0263830 A1 Oct. 30, 2008

(30) Foreign Application Priority Data

Apr. 26, 2007 (JP) ................................. 2007-117178

(51) Int. Cl.
*G05G 1/12* (2006.01)
(52) U.S. Cl. ................. 16/441; 16/442; 16/433; 74/553
(58) Field of Classification Search ............... 16/441, 16/442, 433; 362/26, 27, 85, 100; 116/307, 116/309, DIG. 21; 200/336, 61.08; 74/553
See application file for complete search history.

(56) References Cited

U.S. PATENT DOCUMENTS

| | | | | |
|---|---|---|---|---|
| 3,082,643 A | * | 3/1963 | Grassi et al. | 74/553 |
| 3,902,375 A | * | 9/1975 | Herrick et al. | 74/10.54 |
| 4,499,630 A | * | 2/1985 | Harris et al. | 16/441 |
| 5,857,242 A | * | 1/1999 | Pizzo et al. | 16/441 |
| RE37,687 E | * | 5/2002 | Howie, Jr. | 16/441 |
| 6,512,189 B1 | * | 1/2003 | Schuberth et al. | 200/334 |
| 6,826,805 B2 | * | 12/2004 | Rodawold, Jr. | 16/441 |
| 6,926,002 B2 | * | 8/2005 | Scarrott et al. | 128/200.14 |
| 7,251,861 B2 | | 8/2007 | Suzuki | |
| 7,479,607 B2 | * | 1/2009 | Sack et al. | 200/4 |
| 2004/0226142 A1 | * | 11/2004 | Suzuki | 16/441 |

FOREIGN PATENT DOCUMENTS

| | | |
|---|---|---|
| JP | A-11-189072 | 7/1999 |
| JP | A-2001-266704 | 9/2001 |
| JP | A-2006-210288 | 8/2006 |
| JP | A-2007-048478 | 2/2007 |

OTHER PUBLICATIONS

Office Action dated Feb. 25, 2009 in corresponding Japanese patent application No. 2007-117178 (and English translation).

* cited by examiner

*Primary Examiner* — Daniel P Stodola
*Assistant Examiner* — Rowland D Do
(74) *Attorney, Agent, or Firm* — Posz Law Group, PLC (57) ABSTRACT

An operating knob to be attached to a supporting member includes an operating part and a connector. The connector is attached to the operating part and includes a fitting cylindrical portion, a stopper disposed at an inner circumferential side of the fitting cylindrical portion to protrude on a radial inside, and housing portion. When the operating part is applied with a load greater than or equal to a predetermined value from an exterior in a direction toward the supporting member in a state where a fitting portion of the supporting member is fitted into the fitting cylindrical portion, the stopper is bent from the radial inside to a direction approximately parallel to the rotation axis so as to be housed in the housing portion and the fitting cylindrical portion moves toward the supporting member along an outer circumference of the fitting portion.

11 Claims, 5 Drawing Sheets

OPERATING KNOB

CROSS REFERENCE TO RELATED APPLICATION

The present application is based on and claims priority to Japanese Patent Application No. 2007-117178 filed on Apr. 26, 2007, the contents of which are incorporated in their entirety herein by reference.

FIELD OF THE INVENTION

The present invention relates to an operating knob.

BACKGROUND OF THE INVENTION

In recent years, in order to ensure a safety of a passenger at a time where a vehicle collides, a standard is set in an in-vehicle equipment such as a car-mounted navigation apparatus and a car audio apparatus and various instruments incorporated in an instrument panel in a vehicle compartment so that an operating knob does not harm the passenger. For example, Rule No. 21 of ECE (Economic Commission for Europe) requires that the operating knob is sunk so that a protruding amount of the operating knob is within a certain amount when a load greater than or equal to 378 [N] is applied to the operating knob from an exterior in a direction toward an encoder (i.e., in a sinking direction).

U.S. Pat. No. 7,251,861 (corresponding to JP-2004-338427A) discloses an operating knob that includes a plurality of crushable connecting elements provided from a rotation axis of an encoder toward an outer circumferential side. When a load is applied to the operating knob from an exterior in the sinking direction, the crushable connecting elements are crushed, and thereby the operating knob is sunk.

In the present configuration, when a size of the operating knob becomes large, there is a possibility that the crushable connecting elements are not crushed evenly depending on a direction in which the load is applied. If the crushable connecting elements are not crushed evenly, there is a disadvantage that the crushable connecting element that has not been crushed may remain, and thereby the operating knob may not sink or the operating knob may sink obliquely.

Alternatively, JP-2001-266704A discloses an operating knob that includes shock-absorbing projections. The shock-absorbing projections are provided at a through shaft-hole portion and function as stoppers. When a load is applied to the operating knob from an exterior in the sinking direction, the shock-absorbing projections are crushed and are separated. Thereby, the operating knob is sunk.

In the present configuration, a space for housing the separated shock-absorbing projections is required in the sinking direction. In addition, there is a possibility that the separated shock-absorbing projections are caught. If the separated shock-absorbing projections are caught, also in the present case, the operating knob may not sink or the operating knob may sink obliquely.

SUMMARY OF THE INVENTION

In view of the foregoing problems, it is an object of the present invention to provide an operating knob.

According to a first aspect of the invention, an operating knob is attached to a supporting member in which an outside diameter of a fitting portion that is rotatable on a rotation axis is larger than an outside diameter of a bearing portion, and the operating knob includes an operating part having a hollow portion and a connector attached to the operating part. The connector includes a fitting cylindrical portion configured so that the fitting portion is fitted therein, a stopper disposed at an inner circumferential side of the fitting cylindrical portion to protrude on a radial inside, and housing portion. The stopper is configured to touch an end surface of the supporting member on a side of the operating part in a state where the fitting portion is fitted into the fitting cylindrical portion. The stopper is bent from the radial inside to a direction approximately parallel to the rotation axis so as to be housed in the housing portion, the fitting cylindrical portion moves toward the supporting member along an outer circumference of the fitting portion, and the hollow portion houses a portion of the supporting member on the side of the operating part when the operating part is applied with a load greater than or equal to a predetermined value from an exterior in a direction toward the supporting member in a state where the fitting portion is fitted into the fitting cylindrical portion.

In the present operating knob, the operating part and the connector integrally move toward the supporting member by bending the stopper. Thus, the operating knob can be sunk appropriately.

According to a second aspect of the invention, an operating knob is attached to a supporting member in which an outside diameter of a fitting portion that is rotatable on a rotation axis is smaller than an outside diameter of a bearing portion, and the operating knob includes an attaching part, an operating part having a hollow portion, and a connector attached to the operating part. The attaching part is configured so that the fitting portion is inserted therein and has an outside diameter larger than the outside diameter of the bearing portion. The connector includes a fitting cylindrical portion in which the attaching part is fitted, a stopper disposed at an inner circumferential side of the fitting cylindrical portion to protrude on a radial inside, and housing portion. The stopper is configured to touch an end surface of one of the supporting member and the attaching part on a side of the operating part in a state where the attaching part is attached to the fitting portion and is fitted into the fitting cylindrical portion. The stopper is bent from the radial inside to a direction approximately parallel to the rotation axis so as to be housed in the housing portion, the fitting cylindrical portion moves toward the supporting member along an outer circumference of the attaching part, and the hollow portion houses a portion of the supporting member on the side of the operating part when the operating part is applied with a load greater than or equal to a predetermined value from an exterior in a direction toward the supporting member in a state where the attaching part is attached to the fitting portion and is fitted into the fitting cylindrical portion.

In the present operating knob, the operating part and the connector integrally move toward the supporting member by bending the stopper. Thus, the operating knob can be sunk appropriately.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

An operating knob 1 according to a first embodiment of the invention will be suitably used for a navigation apparatus provided in a vehicle. The operating knob 1 will be described with reference to FIG. 1A to FIG. 3. The operating knob 1 includes an operating part 2 and a connector 3. The operating part 2 is made of resin and has a cap shape. The operating part 2 has a hollow portion 5 that opens on a side of an encoder 4 (i.e., supporting member). The operating part 2 further includes a plurality of (e.g., eight) bosses 6. The bosses 6 are arranged evenly along a circumferential direction and extend in a direction approximately parallel to a rotation axis 11 of the encoder 4 shown in FIG. 2.

The connector 3 is made of a resin having a high toughness, for example, polycarbonate resin. The connector 3 is formed by a combination of a contact surface portion 7 having an approximately circular plate shape and a fitting cylindrical portion 8 having an approximately cylindrical shape. The contact surface portion 7 has a plurality of (e.g., eight) insertion holes 9 in which the plurality of bosses 6 formed at the operating part 2 is inserted respectively. On an outer circumferential side of the fitting cylindrical portion 8, a plurality of (e.g., eight) ribs 10 (reinforced elements) for ensuring the strength of the fitting cylindrical portion 8 is disposed across the contact surface portion 7, and the ribs 10 are arranged evenly along the circumferential direction. In the present case, each of the ribs 10 is located at a middle portion of two insertion holes 9 provided at the contact surface portion 7.

The fitting cylindrical portion 8 extends in a direction approximately parallel to the rotation axis II. At a halfway of an inner circumferential side of the fitting cylindrical portion 8 in the extending direction, two stoppers 11a and 11b that protrude on a radial inside are arranged evenly in the circumferential direction. That is, the stoppers 11a and 11b are arranged to have an angle of 180 degrees therebetween. A portion from a position at which the stoppers 11a and 11b are provided to the contact surface portion 7 expands outwardly. A space generated due to the expansion provides housing portions 12a and 12b. When the stoppers 11a and 11b are bent from the radial inside to a direction approximately parallel to the rotation axis II, the bent stoppers 11a and 11b are housed in the housing portion 12a and 12b. In addition, the fitting cylindrical portion 8 has two slits 13a and 13b. The stoppers 11a and 11b are provided at portions extending from portions at which the slits 13a and 13b are provided in a direction approximately parallel to the rotation axis II.

The encoder 4 is formed by a combination of a fitting portion 14 that is rotatable on the rotation axis II and a bearing portion 15 that holds the fitting portion 14 to be rotatable. Teeth are formed on the whole outer circumference of the fitting portion 14, and one end side of the bearing portion 15 is fixed, for example, to a printed board 16. A spring 17 is made of metal. The spring 17 has a discontinuous portion and has a ring shape that has an inside diameter equal to an outside diameter of the fitting cylindrical portion 8 of the connector 3. In view of the circumstance that the connector 3 is made of resin, the spring 17 is disposed for preventing a loose of a fit (i.e., idle) between the fitting cylindrical portion 8 of the connector 3 and the fitting portion 14 of the encoder 4, which may be generated due to a thermal contraction or a thermal expansion of the resin.

In the components configured in this manner, after the bosses 6 of the operating part 2 are inserted into the insertion holes 9 of the connector 3, end portions of the bosses 6 (i.e., portions protruding from the contact surface portion 7) are heated, and then the bosses 6 are joined to the contact surface portion 7 by welding. Thereby, the operating part 2 is attached to the connector 3 to configurate the operating knob 1. In addition, the spring 17 is disposed at the outer circumference of the fitting cylindrical portion 8 of the connector 3 and the fitting portion 14 of the encoder 4 is fitted into the fitting cylindrical portion 8 of the connector 3. Thereby, the operating knob 1 is (the operating part 2 and the connector 3 are integrally) attached to the encoder 4.

Because the fitting portion 14 of the encoder 4 is fitted into the fitting cylindrical porting 8 of the connector 3 so that peaks of the teeth formed at the outer circumference of the fitting portion 14 are crushed, the fitting portion 14 of the encoder 4 is firmly joined to the connector 3. Thereby, the fitting portion 14 of the encoder 4 rotates following a rotation of the operating knob 1. When the fitting portion 14 of the encoder 4 is fitted into the fitting cylindrical portion 8 appropriately, an end surface 14a of the fitting portion 14 touches the stoppers 11a and 11b.

An outside diameter ("r1" in FIG. 3) of the fitting portion 14 of the encoder 4 is larger than an outside diameter ("r2" in FIG. 3) of the bearing portion 15 of the encoder 4. Thus, when the operating knob 1 sinks, an end side of the fitting cylindrical portion 8 does not touch the bearing portion 15 of the encoder 4. That is, a movement of the fitting cylindrical portion 8 is not disturbed. Furthermore, an inside diameter ("R" in FIG. 3) of the hollow portion 5 of the operating part 2 is larger than the outside diameter of the fitting portion 14 of the encoder 4. Thus, when the operating knob 1 sinks, the hollow portion 5 of the operating part 2 houses the fitting portion 14 of the encoder 4.

Figure 1A:
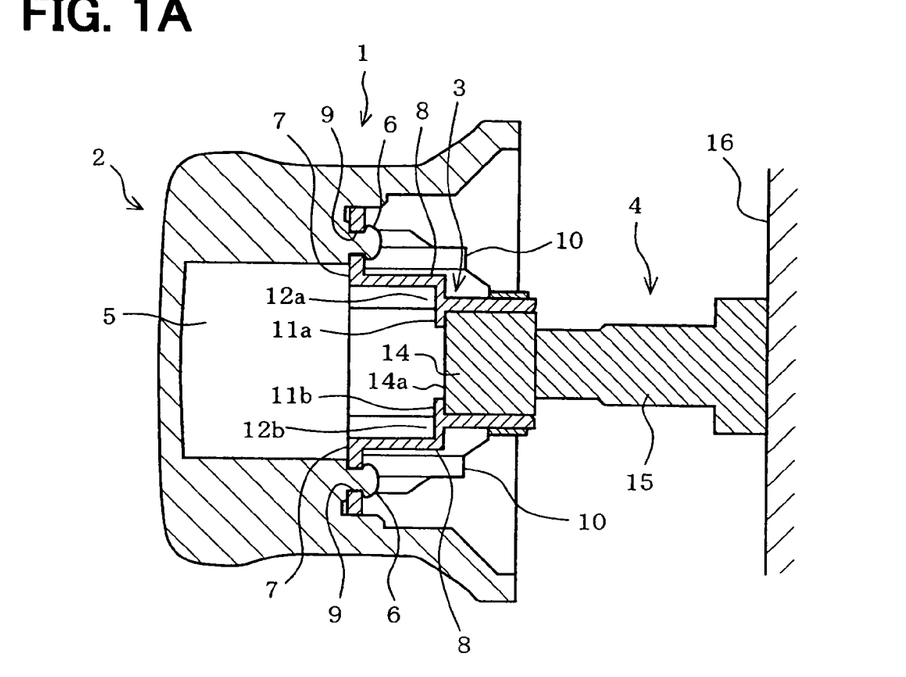
FIG. 1A and FIG. 1B are cross-sectional views showing an operating knob according to a first embodiment of the invention.
Figure 1B:
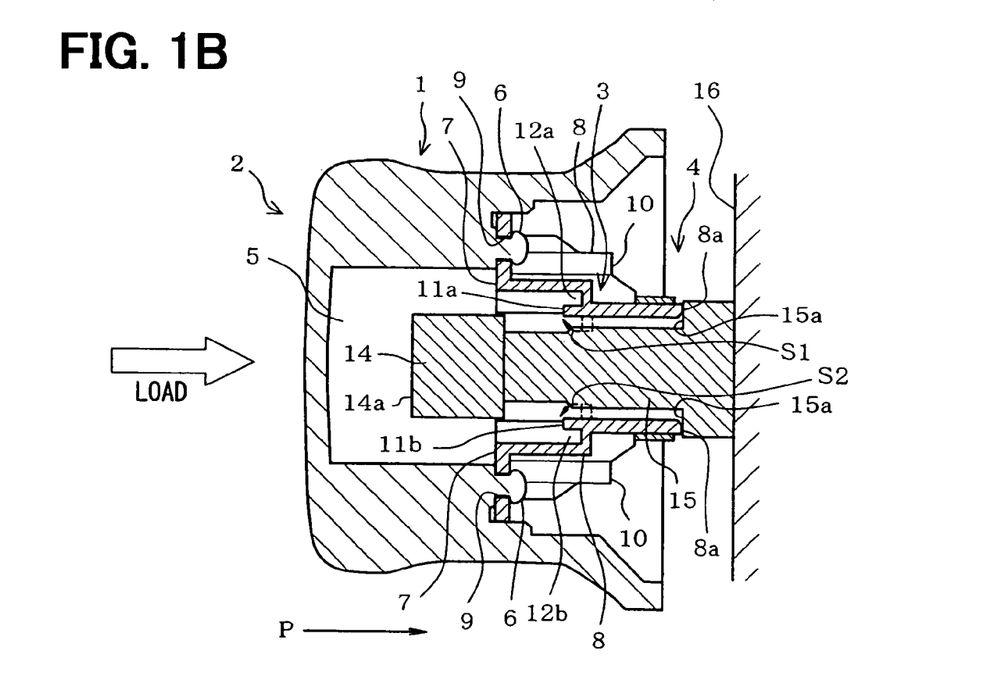

When a load greater than or equal to a predetermined value is applied to the operating knob 1 from an exterior in a direction toward the encoder 4, i.e., a sinking direction shown by the arrow P in FIG. 1B, a stress is applied to the operating part 2 and the connector 3 so as to move integrally in the sinking direction. Then, a pressure is applied to the stoppers 11a and 11b, which protrude on the radial inside, from the end surface 14a of the fitting portion 14 of the encoder 4 as a reaction of the stress. When the load applied to the operating knob 1 exceeds the predetermined value and the pressure applied to the stoppers 11a and 11b from the end surface 14a of the fitting portion 14 of the encoder 4 exceeds the predetermined value, the stoppers 11a and 11b, which protrude on the radial inside, are bent in a direction that is approximately parallel to the rotation axis II and that is an approximately opposite to the encoder 4. Thereby, the stoppers 11a and 11b are housed in the housing portion 12a and 12b (see the arrows S1 and S2 in FIG. 1B).

Thus, the fitting cylindrical portion 8 of the connector 3 moves along the outer circumference of the fitting portion 14 of the encoder 4 and the operating part 2 and the connector 3 integrally move toward the encoder 4. As a result, as shown in FIG. 1B, the operating knob 1 sinks until an end 8a of the fitting cylindrical portion 8 touches a touching surface 15a of the bearing portion 15 of the encoder 4. At this time, the stoppers 11a and 11b bent from the radial inside to the direction approximately parallel to the rotation axis II remain without being separated. Thus, the stoppers 11a and 11b and an inner wall of the fitting cylindrical portion 8 function as guides, and thereby the operating knob 1 sinks straight in the sinking direction without a generation of a rattle. In addition, because the ribs 10 are arranged evenly at the outer circumference of the fitting cylindrical portion 8, the fitting cylindrical portion 8 is prevented from being broken or deformed during the operating knob 1 is sinking, and a generation of a rattle is restricted. Thus, the operating knob 1 sinks straight also due to the presence of the ribs 10.

A strength of this crushable structure for sinking the operating knob 1 can be determined freely by changing a thickness (a dimension in the sinking direction), a width (a dimension in the circumferential direction), a length (a dimension in the radial direction) and the number of the stoppers 11a and 11b.

As described above, when the load greater than or equal to the predetermined value is applied to the operating knob 1 from the exterior in the sinking direction in a state where the operating knob 1 is attached to the encoder 4, the operating part 2 and the connector 3 integrally move toward the encoder 4 while bending the stoppers 11a and 11b provided on the inner circumferential side of the fitting cylindrical portion 8. Thus, even when the size of the operating knob 1 becomes large, the operating knob can be sunk appropriately.

In addition, the stoppers 11a and 11b bent from the radial inside to the direction approximately parallel to the rotation axis 11 are housed in the housing portion 12a and 12b provided at positions not to disturb the movement of the fitting cylindrical portion 8 along the outer circumference of the fitting portion 14 in the axial direction. Thus, a space in the sinking direction for housing separated shock-absorbing projections is not required. In addition, because the stoppers 11a and 11b are configured to remain without being separated, the stoppers 11a and 11b and the inner wall of the fitting cylindrical portion 8 can function as the guides. Thereby, a generation of a rattle in the sinking direction is restricted and the operating knob 1 can be sunk straight with a high degree of certainty.

Furthermore, because the ribs 10 for ensuring the strength of the fitting cylindrical portion 8 are formed on the outer circumferential side of the fitting cylindrical portion 8, the fitting cylindrical portion 8 is prevented from being broken or deformed during the operating knob 1 is sinking, and a generation of a rattle in the sinking direction is restricted. As a result, the operating knob 1 can be sunk straight also due to the presence of the ribs 10. In addition, because the stoppers 11a and 11b are arranged evenly in the circumferential direction, the load applied to the operating part 2 from the exterior can be transmitted to the encoder 4 evenly through the stoppers 11a and 11b.

Furthermore, the stoppers 11a and 11b are provided at the portions extending from the portions at which the slits 13a and 13b are provided in the direction approximately parallel to the rotation axis II. Thus, the load applied from the exterior in the sinking direction function as a stress toward the outside in a diagonal direction of a direction that connects the portions of the fitting cylindrical portion 8 at which the slits 13a and 13b are provided. In contrast, the load function as a stress toward an inside in the direction that connects the portions of the fitting cylindrical portion 8 at which the slits 13a and 13b are provided. Thus, the load applied to the operating part 2 from the exterior can be effectively transmitted to the encoder 4 through the stoppers 11a and 11b.

Second Embodiment

Figure 2:
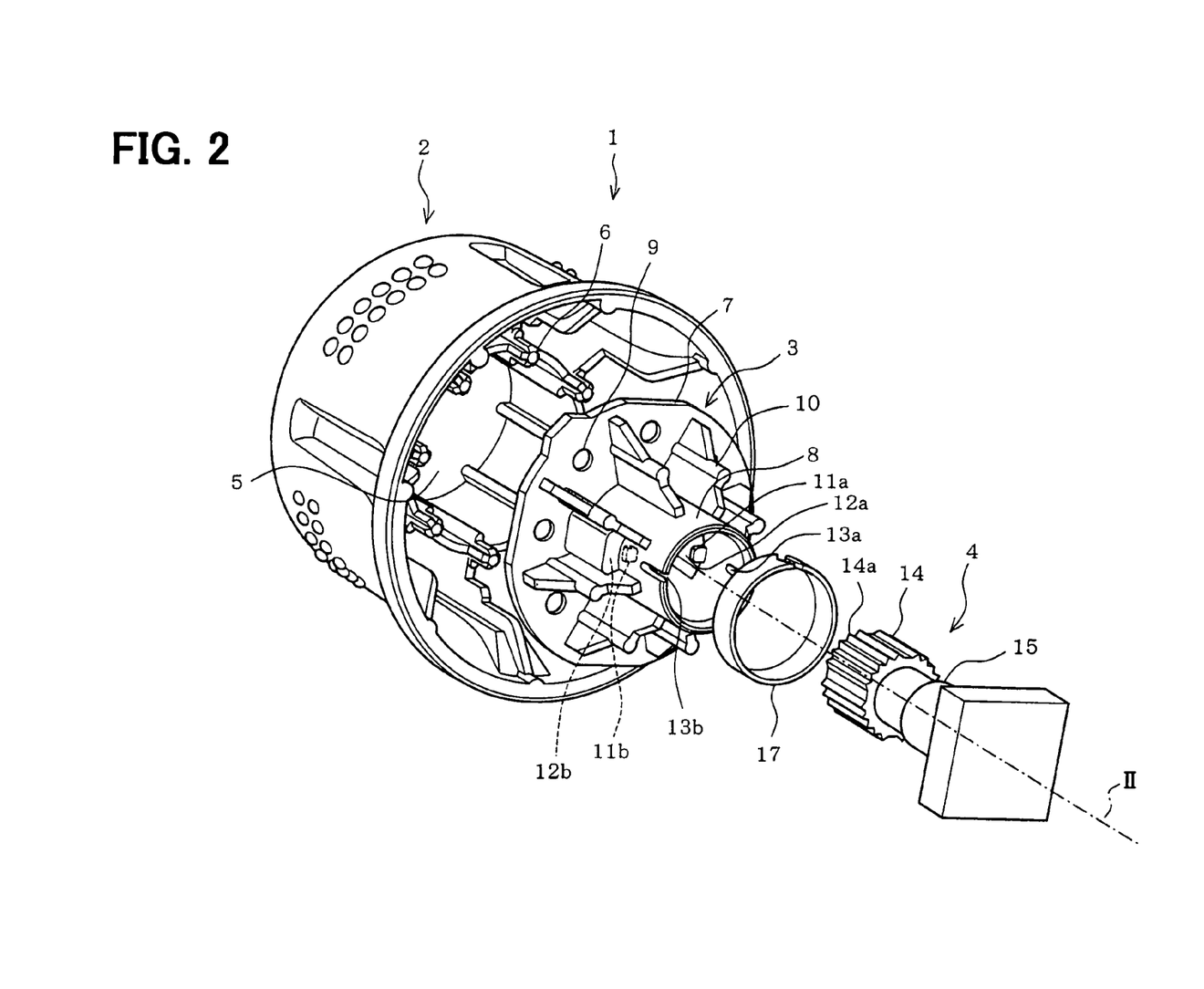
FIG. 2 is an exploded perspective view showing the operating knob according to the first embodiment.
Figure 3:
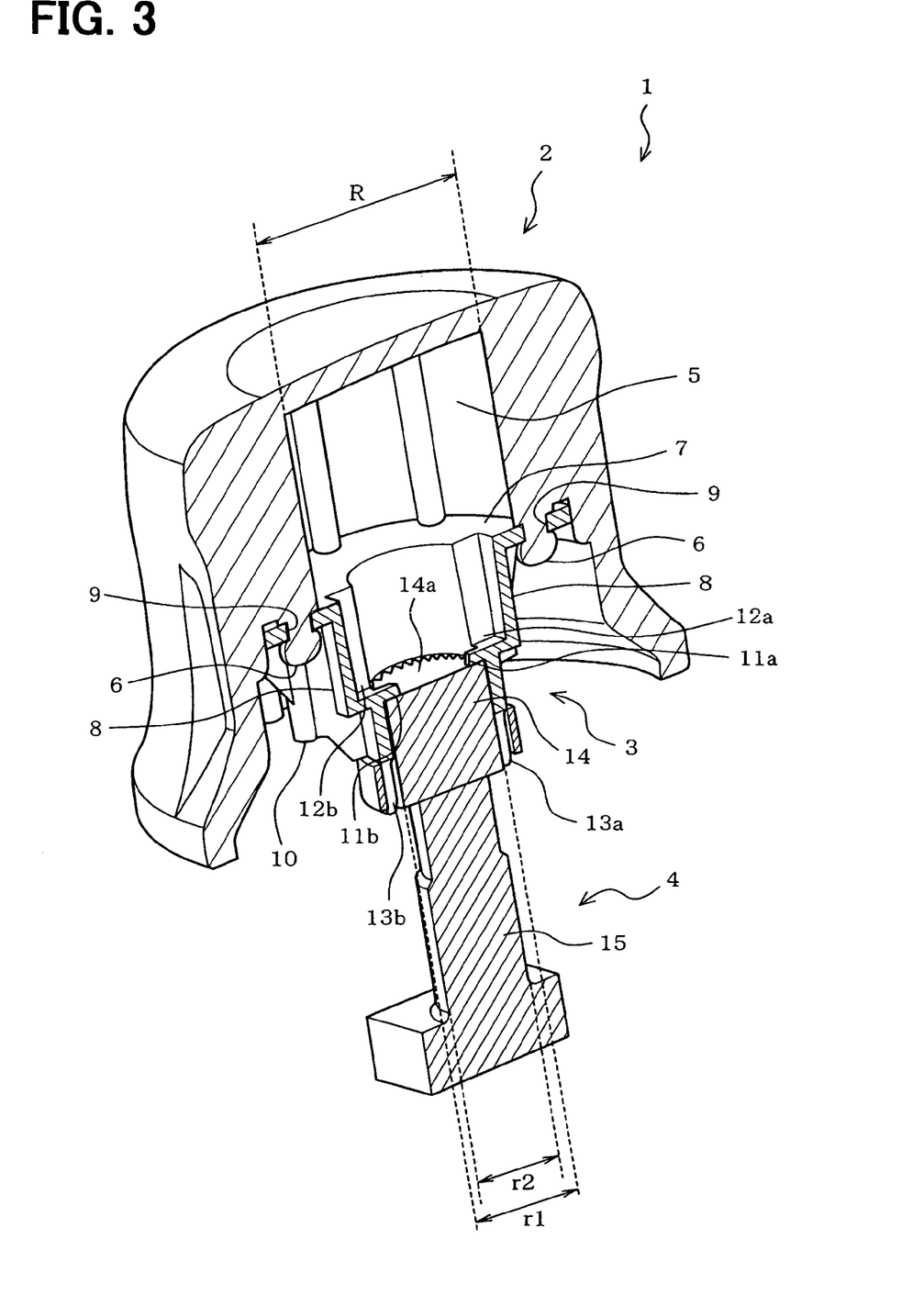
FIG. 3 is a perspective cross-sectional view showing a state where the operating knob according to the first embodiment is attached to an encoder.

Next, an operating knob 1 according to a second embodiment of the invention will be described with reference to FIG. 4 and the FIG. 5. A description of the same parts as the above-described first embodiment is omitted and different parts will be described. The operating knob 1 shown in FIG. 2 is attached to the encoder 4 in which the outside diameter of the fitting portion 14 is larger than the outside diameter of the bearing portion 15. In contrast, the operating knob 1 shown in FIG. 4 is attached to an encoder 22 in which an outside diameter of a fitting portion is smaller than an outside diameter of a bearing portion.

Figure 4:
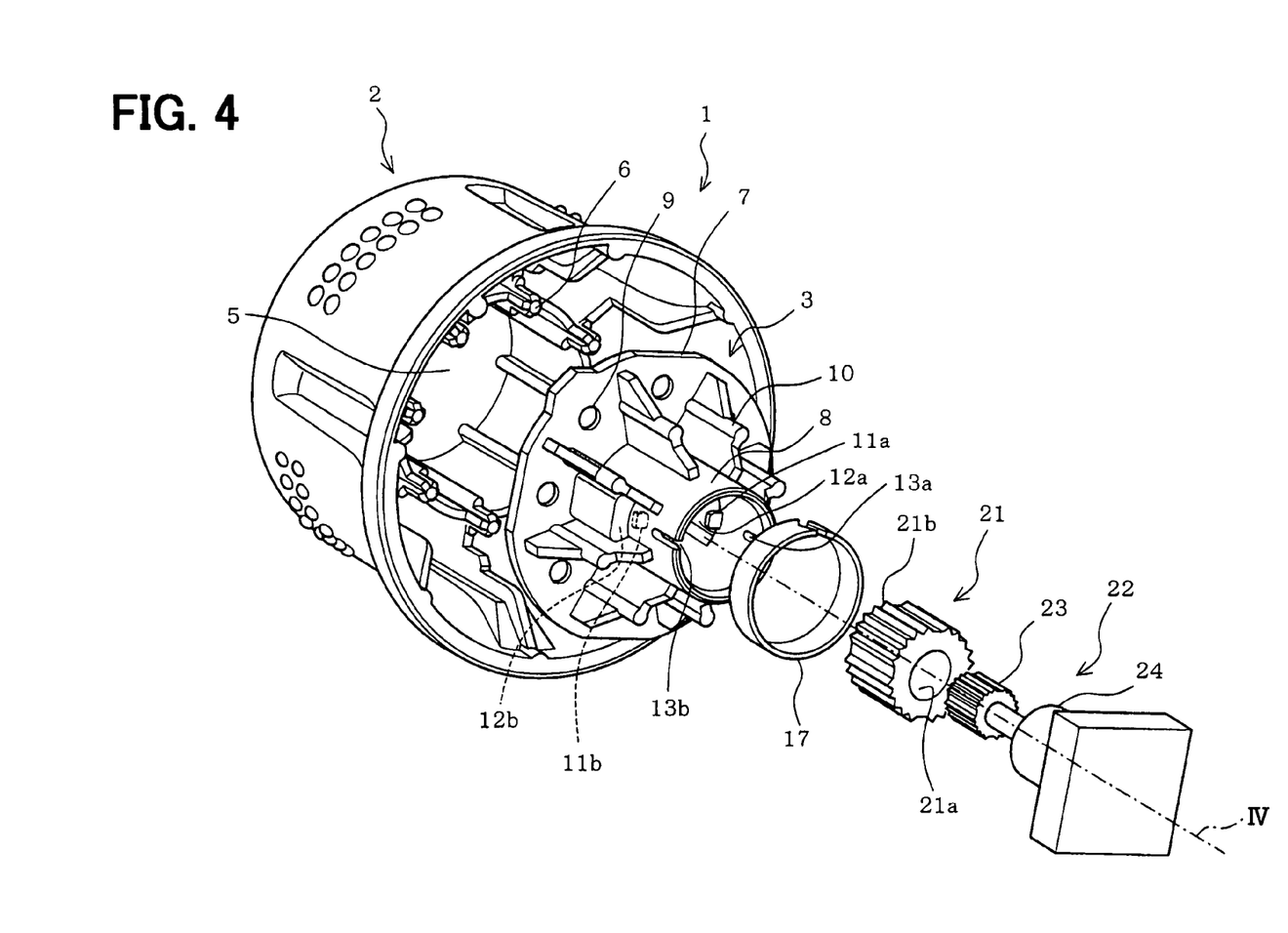
FIG. 4 is an exploded perspective view showing an operating knob according to a second embodiment of the invention.
Figure 5:
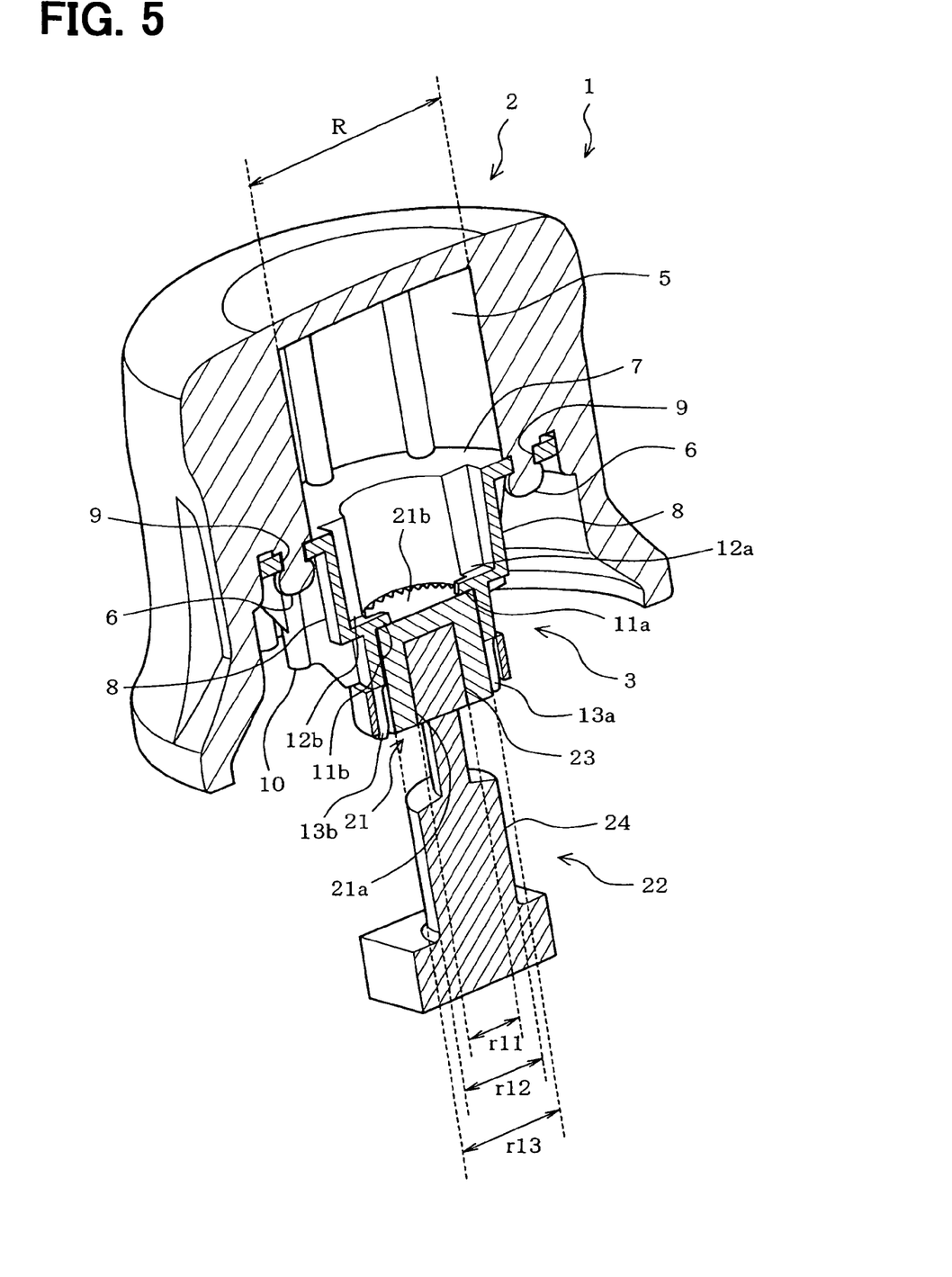
FIG. 5 is a perspective cross-sectional view showing a state where the operating knob according to the second embodiment is attached to another encoder.

As shown in FIG. 4, the operating knob 1 includes an attaching part 21 in addition to the operating part 2 and the connector 3. The attaching part 21 has a fitting hole 21a having a concave shape, and the attaching part 21 is attached to a fitting portion 23 of the encoder 22 by inserting the fitting portion 23 of the encoder 22 into the fitting hole 21a. In the present case, an outside diameter ("r11" shown in FIG. 5) of the fitting portion 23 of the encoder 22 is smaller than an outside diameter ("r12" shown in FIG. 5) of a bearing portion 24 of the encoder 22. However, an outside diameter ("r13" shown in FIG. 5) of the attaching part 21 attached to the fitting portion 23 of the encoder 22 is larger than the outside diameter of the bearing potion 24 of the encoder 22. In FIG. 4, a rotation axis of the encoder 22 is shown as an axis IV.

In the present case, the fitting portion 23 of the encoder 22 is inserted into the fitting hole 21a of the attaching part 21 and the attaching part 21 is fitted into the fitting cylindrical portion 8 of the connector 3, and thereby the operating knob 1 is attached to the encoder 22. Thus, apparently, it has an aspect same as an aspect of the operating knob 1 in FIG. 2 attached to the encoder 4. The fitting portion 23 of the encoder 22 is inserted into the fitting hole 21a of the attaching part 21 in such a manner that peaks of teeth formed at an outer circumference of the fitting portion 23 of the encoder 22 are crushed, and the attaching part 21 is fitted into the fitting cylindrical portion 8 of the connector 3 in such a manner that peaks of teeth formed at an outer circumference of the attaching part 21 are crushed. Thus, the fitting portion 23 of the encoder 22 is firmly joined to the connector 3 through the attaching part 21. Thereby, the fitting portion 23 of the encoder 22 rotates following the rotation of the operating knob 1. When the fitting portion 23 of the encoder 22 is appropriately fitted into the fitting cylindrical portion 8 of the connector 3 through the attaching part 21, an end surface 21a of the attaching part 21b touches the stoppers 11a and 11b.

As described above, in the present embodiment, the operating knob 1 shown in FIG. 4 is attached to the encoder 22, in which the outside diameter of the fitting portion 23 is smaller than the outside diameter of the bearing portion 24, through the attaching part 21. The operating knob 1 shown in FIG. 4 can have an effect similar to that of the operating knob 1 shown in FIG. 2.

Other Embodiments

Although the present invention has been fully described in connection with the preferred embodiments thereof with reference to the accompanying drawings, it is to be noted that various changes and modifications will become apparent to those skilled in the art.

For example, an application of the operating knob 1 is not limited to the navigation apparatus provided in the vehicle. Alternatively, the operating knob 1 may be used for an operating knob in an in-vehicle equipment such as a car audio apparatus and various instruments incorporated in an instrument panel in a vehicle compartment.

The fitting portions 14 and 23 of the encoder may be made of metal. The cross-sectional shapes of the fitting portions 14 and 23 of the encoder and the cross-sectional shape of the attaching part 21 in a direction perpendicular to the rotation axis II or IV may be D-cut shape as long as a joint strength of the fitting portion 14 of the encoder 4 with respect to the connector 3 in the first embodiment, and a joint strength of the fitting portion 23 of the encoder 22 with respect to the attaching part 21 and a joint strength of the attaching part 21 with respect to the connector 3 in the second embodiment are ensured sufficiently.

The number of the stopper provided in the inner circumferential side of the fitting cylindrical portion 8 of the connector 3 may be one or more than two. When more than two stoppers are provided, the stoppers may be arranged evenly in the circumferential direction.

The number of the ribs 10 provided on the outer circumferential side of the fitting cylindrical portion 8 of the connector 3 may be less than eight or more than eight as long as a strength for restricting a generation of a rattle at a time where the operating part 2 and the connector 3 integrally move toward the encoder 4 or 23 can be ensured. In the present case, the ribs 10 may be arranged evenly in the circumferential direction.

Such changes and modifications are to be understood as being within the scope of the present invention as defined by the appended claims.

What is claimed is:

1. An operating knob device comprising:
   a supporting member, which has a distal end; and
   an operating knob, which is attached to the distal end of the supporting member, wherein
   the operating knob comprises a bearing portion and a fitting portion,
   the fitting portion is rotatable about a rotation axis of the operating knob,
   an outside diameter of the fitting portion is larger than an outside diameter of the bearing portion, and
   the operating knob further comprises:
   an operating part that has a hollow portion; and
   a connector that is attached to the operating part and that includes
   a fitting cylindrical portion configured so that the fitting portion is fitted therein,
   a stopper disposed at an inner circumferential side of the fitting cylindrical portion and in a position protruding radially inward, and
   a housing portion,
   the stopper contacts a distal end surface of the supporting member in a state where the fitting portion is fitted into the fitting cylindrical portion; and
   when a load greater than or equal to a predetermined value is applied to the operating part from an exterior location in a direction toward the supporting member in a state where the fitting portion is fitted into the fitting cylindrical portion,
   (i) a reaction corresponding to the load is applied to the stopper from the distal end surface of the supporting member,
   (ii) the stopper is deformed from the position protruding radially inward to a bent position extending in a direction approximately parallel to the rotation axis so as to be housed in the housing portion, wherein the distal end of the supporting member engages and slides against the stopper to cause the stopper to bend to the bent position,
   (iii) the fitting cylindrical portion moves toward the supporting member along an outer circumference of the fitting portion, and
   (iv) the hollow portion houses the distal end of the supporting member.

2. The operating knob device according to claim 1, wherein the stopper is bent in direction that is opposite to the load due to being pressed by the distal end surface when the load is applied in the state where the fitting portion is fitted into the fitting cylindrical portion.

3. The operating knob device according to claim 1, wherein the connector has a reinforced element on an outer circumferential side of the fitting cylindrical portion for enhancing a strength of the fitting cylindrical portion.

4. The operating knob device according to claim 1, wherein: the stopper includes a plurality of stopper elements; and the plurality of stopper elements is arranged evenly in a circumferential direction of the fitting cylindrical portion.

5. The operating knob device according to claim 4, wherein:
   the fitting cylindrical portion has a plurality of slits on a side where the fitting portion is fitted;
   the plurality of slits opens in a direction approximately parallel to the rotation axis; and
   the plurality of stopper elements is disposed at a portion that extends from a portion where the plurality of slits is provided in the direction approximately parallel to the rotation axis.

6. The operating knob device according to claim 1, wherein the stopper and the fitting cylindrical portion are integrated, and
   when the fitting cylindrical portion moves toward the supporting member, the stopper moves along with the fitting cylindrical portion.

7. An operating knob device comprising:
   a rotatable supporting member, which has a distal end; and
   an operating knob, which is fitted on the distal end of the rotatable supporting member, wherein the operating knob includes an operating part, which has a hollow portion, and a connector, which is attached to the operating part, and wherein the connector includes
   a fitting cylindrical portion, which receives a fitting portion of the supporting member,
   a stopper, which is formed at an inner circumferential surface of the fitting cylindrical portion, wherein the stopper extends radially toward a rotation axis of the connector, and
   a housing portion,
   wherein the stopper engages a distal end surface of the supporting member that axially faces the operating part when the fitting portion is received by the fitting cylindrical portion; and
   wherein when a load greater than or equal to a predetermined value is applied to an external surface of the operating part in a direction toward the supporting member when the fitting portion is fitted into the fitting cylindrical portion,
   (i) a reaction corresponding to the load is applied to the stopper from the distal end surface of the supporting member,
   (ii) the stopper is deformed from the radially inward extending position by approximately ninety degrees to a bent position in which the stopper extends in a direction approximately parallel to the axis of the connector and extends into the housing portion, wherein the stopper is deformed by direct sliding engagement between the stopper and the distal end of the supporting member, (iii) the fitting cylindrical portion moves toward the supporting member along an outer surface of the fitting portion, and (iv) the hollow portion houses the distal end of the supporting member.

8. The operating knob device according to claim 7, wherein a distal end of the stopper is deformed to extend in a direction opposite to that of the external force as a result of a reaction force applied by the distal end surface of the supporting member to the stopper when the load greater than or equal to the predetermined value is applied to the operating part toward the supporting member in the state where the fitting portion is fitted into the fitting cylindrical portion.

9. The operating knob device according to claim 7, wherein the connector has a reinforced element on an outer circumferential surface of the fitting cylindrical portion for strengthening the fitting cylindrical portion.

10. The operating knob device according to claim 7, wherein: the stopper is one of a plurality of stopper elements; and the plurality of stopper elements is arranged uniformly in a circumferential direction about the fitting cylindrical portion.

11. The operating knob device according to claim 10, wherein:

the fitting cylindrical portion has a plurality of slits at a location that corresponds to the fitting portion when the fitting portion is received by the fitting cylindrical portion;

each of the slits extends in a direction approximately parallel to the rotation axis of the knob; and each of the stopper elements is axially aligned with one of the slits.

* * * * *